US007822664B2

(12) United States Patent
Friedman

(10) Patent No.: US 7,822,664 B2
(45) Date of Patent: Oct. 26, 2010

(54) FUTURE CHECK FINANCING METHOD

(76) Inventor: Adam Friedman, 8383 Clairemont Mesa Blvd., Suite 3, San Diego, CA (US) 92111

( * ) Notice: Subject to any disclaimer, the term of this patent is extended or adjusted under 35 U.S.C. 154(b) by 1072 days.

(21) Appl. No.: 10/894,806

(22) Filed: Jul. 19, 2004

(65) Prior Publication Data

US 2006/0015427 A1 Jan. 19, 2006

(51) Int. Cl.
*G06Q 40/00* (2006.01)
(52) U.S. Cl. ....................................................... 705/35
(58) Field of Classification Search ........................ None
See application file for complete search history.

(56) References Cited

U.S. PATENT DOCUMENTS

| | | | | |
|---|---|---|---|---|
| 5,490,251 | A * | 2/1996 | Clark et al. | 709/237 |
| 5,679,938 | A * | 10/1997 | Templeton et al. | 235/379 |
| 5,694,552 | A * | 12/1997 | Aharoni | 705/37 |
| 5,798,508 | A | 8/1998 | Walker et al. | |
| 6,070,141 | A * | 5/2000 | Houvener et al. | 705/1 |
| 6,754,640 | B2 | 6/2004 | Bozeman | |
| 6,854,640 | B2 * | 2/2005 | Peklo | 235/100 |
| 6,938,022 | B1 * | 8/2005 | Singhal | 705/74 |
| 7,050,932 | B2 * | 5/2006 | Selby et al. | 702/179 |
| 7,155,409 | B1 * | 12/2006 | Stroh | 705/37 |
| 7,191,149 | B1 * | 3/2007 | Lanham et al. | 705/38 |
| 7,330,835 | B2 * | 2/2008 | Deggendorf | 705/39 |
| 7,373,329 | B2 * | 5/2008 | Gallagher et al. | 705/39 |
| 7,571,132 | B2 * | 8/2009 | Cole | 705/37 |
| 7,580,884 | B2 * | 8/2009 | Cook | 705/38 |
| 7,607,570 | B1 * | 10/2009 | Constantine | 235/375 |
| 2001/0001856 | A1 | 5/2001 | Gould et al. | |
| 2002/0040344 | A1 | 4/2002 | Preiser et al. | |
| 2002/0046172 | A1 | 4/2002 | Aharoni | |
| 2002/0055904 | A1 | 5/2002 | Mon | |
| 2002/0103749 | A1 * | 8/2002 | Agudo et al. | 705/38 |
| 2002/0120846 | A1 * | 8/2002 | Stewart et al. | 713/168 |
| 2002/0169641 | A1 * | 11/2002 | Wallace, Jr. | 705/4 |
| 2003/0130948 | A1 * | 7/2003 | Algiene et al. | 705/44 |
| 2003/0167225 | A1 * | 9/2003 | Adams | 705/38 |
| 2004/0002914 | A1 * | 1/2004 | Munro | 705/38 |

(Continued)

OTHER PUBLICATIONS

Resolution Feb. 5, 2002, Limitatinos on Damages for Post DAted NSF checks. Author—Gina Dronet, pp. 1-2, Feb. 5, 2002 http://www.cdcba.org/pdfs/R2002/02-05-02.pdf.*

(Continued)

*Primary Examiner*—Alexander Kalinowski
*Assistant Examiner*—Bruce I Ebersman
(74) *Attorney, Agent, or Firm*—ARC IP Law, PC; Joseph J. Mayo

(57) ABSTRACT

A Future Check Financing Method is disclosed. The method enables purchasers and others to present future-dated checks (or other payment vehicles) at the point of sale for purchases. The potential recipient of the future-dated payment vehicles and/or a check guarantee entity is able to make a lending decision based solely on the presenter's check writing history. The recipient of future-dated checks under the method will receive full payment (typically minus service charges) nearly immediately after completing the transaction with the presenter, rather than when all future-dated payment vehicles become payable. The check writing history may include negative check writing history for the presenter, but also may include positive check writing history for the presenter.

11 Claims, 6 Drawing Sheets

U.S. PATENT DOCUMENTS

2004/0034583 A1    2/2004  Lanier et al.
2004/0236941 A1*  11/2004  Sanchez .................... 713/155
2005/0137982 A1    6/2005  Michelassi et al.
2005/0177489 A1*   8/2005  Neff et al. .................... 705/38

OTHER PUBLICATIONS

Resolution Feb. 5, 2002 (2 pages, internet citation).*
Payments from Afar, New York, May 1993, vol. 18, issue 5, p. 21, 5 pages.*

* cited by examiner

FUTURE CHECK FINANCING METHOD

BACKGROUND OF THE INVENTION

1. Field of the Invention

This invention relates generally to Point of Sale financing methods and, more specifically, to a Future Check Financing Method.

2. Description of Related Art

Payment systems are undergoing rapid change. Historically, there were two major ways of paying for goods or services—either by cash or check ("payment by cash"), or by loan ("payment by credit"). Technology and the ready availability of credit to individuals has spawned a nearly limitless variety of payment methods that are now available. The current invention relates to one particular payment method based upon "future check" payment. Before discussing the conventional future check payment method, we will first begin by discussing the other more traditional payment methods conventionally available.

SUMMARY OF THE INVENTION

In light of the aforementioned problems associated with the prior methods and systems, it is an object of the present invention to provide a Future Check Financing Method. The method should enable purchasers and others to present future-dated checks (or other payment vehicles) at the point of sale for purchases. It is a further object that the potential recipient of the future-dated payment vehicles and/or a check guarantee entity be able to make a lending decision based solely on the presenter's check writing history. It is yet another object that the recipient of future-dated checks under the method receive full payment (typically minus service charges) nearly immediately after completing the transaction with the presenter, rather than when all future-dated payment vehicles become payable. It is another object that the check writing history may include negative check writing history for the presenter, but also positive check writing history.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Future Check Financing Method.

Figure 1:
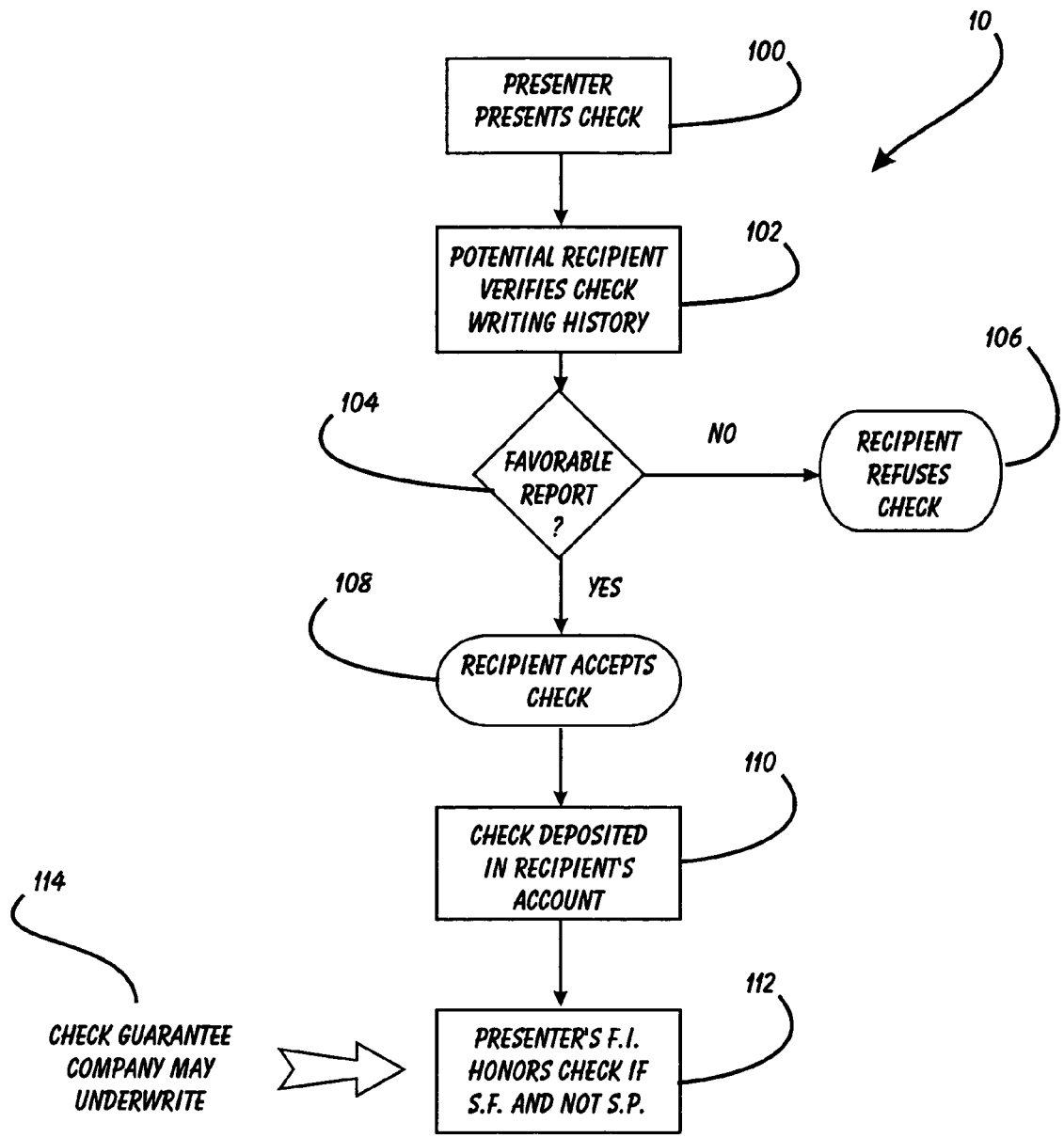
FIG. 1 is a flowchart depicting a conventional payment-by-check method.

The present invention can best be understood by initial consideration of the prior methods, commencing with FIG. 1. FIG. 1 is a flowchart depicting a conventional payment-by-check method. The conventional payment-by-check method 10 commences with a presenter presenting a check 100 presumably to a seller or merchant selling a good or service. The potential recipient historically will verify the check writing history of the presenter 102 (many times using the assistance of a check guarantee company). The check writing history is available through a variety of different sources or databases that can be purchased by merchants. Well-known databases include the SCAN Database and/or the NCN Database. There are also other private and internal databases. These databases all provide information of any negative activity related to an individual's check writing. For example, if an individual has written a number of checks that either bounced or if there were other problems with payment, it would be indicated in one of these negative check history databases.

Returning to the method 10, the potential recipient determines under its own guidelines (or a check guarantee company's guidelines, if appropriate) whether or not the check writing history is favorable 104. Presumably if the potential recipient determines that the report is unfavorable (or if the check guarantee company declines to guarantee the check), the recipient will refuse to accept the check 106. If, however, the history is favorable, the recipient will then deposit the check in their bank account 110 after which the presenter's financial institution will honor the check 112 assuming that there are sufficient finds and there has not been a stop payment on the check (and/or the checking account is not closed. The report is typically received immediately at the point of sale, but may also be retrieved by phone, facsimile, or even world wide web; it usually consists of a "yes", a "no", or a "call center code."

Since the check writing history does not report on the status of the individual's bank account, there has been no verification of this information so there is some risk to the recipient that the presented check will not clear. To prevent a total loss, it is not uncommon for a recipient to subscribe with a check guarantee entity 114. The check guarantee entity 114 will, for a percentage of the check amount, guarantee payment to the recipient. If at some future time the presenter (or the presenter's financial institution) does not honor the check, the check guarantee entity will be left to recover the funds from the presenter. If we now turn to FIG. 2, we can examine another current payment-by-check method.

Figure 2:
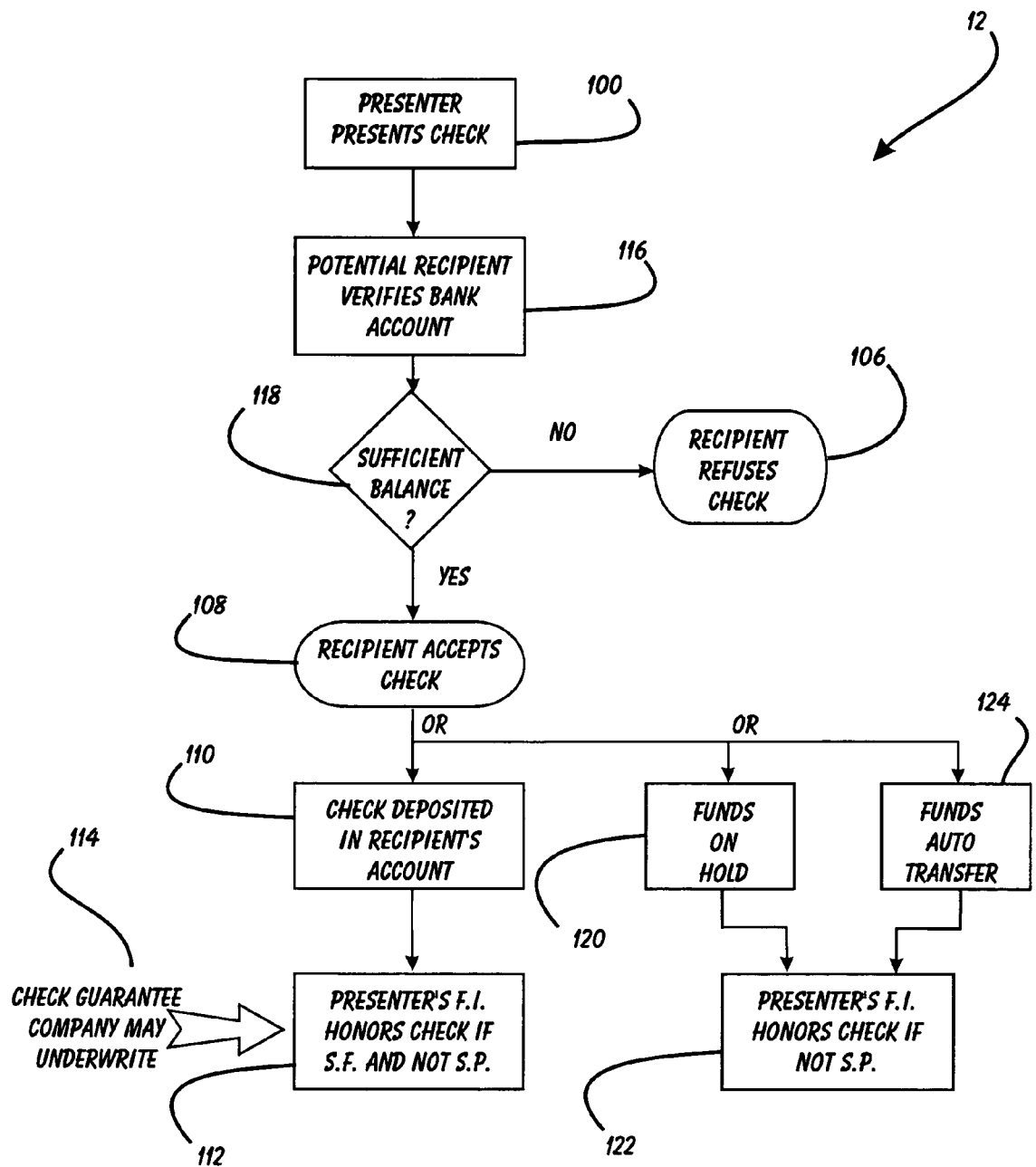
FIG. 2 is a flowchart of an alternate conventional payment-by-check method.

FIG. 2 is a flowchart of an alternate conventional payment-by-check method. In the alternate conventional check payment method 12, the presenter presents the check and the potential recipient and/or check guarantee company verifies the presenter's bank account 116. Verifying the bank account in this case means using a banking network such as Balance Verification and/or manually calling the presenter's bank to verify that funds are available. The potential recipient and/or check guarantee entity will then make a determination of whether the balance is sufficient 118 for him or her to accept the check. Presumably if the bank reports adequate balance, the recipient and/or check guarantee entity would be expected to accept the check (when a specific amount cannot be verified). If, however, there is an insufficient balance, it would be expected that the recipient and/or check guarantee entity would refuse the check 106.

If the recipient and/or check guarantee entity accepts the check 108, the check is deposited into the recipient and/or check guarantee entity's account 110 and then the presenter's financial institution honors the check if there are sufficient funds and there's not been a stop payment or closed account when the time comes for the check to clear. Because there is a time delay between the bank account verification 116 and the occasion for the presenter's financial institution to honor the check 112, there is some risk that payment won't occur. Again, a check guarantee entity may be engaged 114 to underwrite the payment of the check.

In more recent systems, a merchant may be able, through the bank account verification, to actually place the funds on hold 120, after which, when the check is deposited, the presenter's financial institution will honor the check as long as there's not been a stop payment 122. It is believed there are also occasions where the funds will actually automatically transfer to the recipient and/or check guarantee entity's bank 124 upon verification of the presenter's bank account 116. The specifics of these transactions are not known, but it is believed that they do exist. Again, in this prior method 12, the check guarantee entity may be engaged to underwrite checks 114. As discussed above, the other conventional approach to purchasing goods or services is by credit. A conventional method for credit purchases is depicted in FIG. 3.

Figure 3:
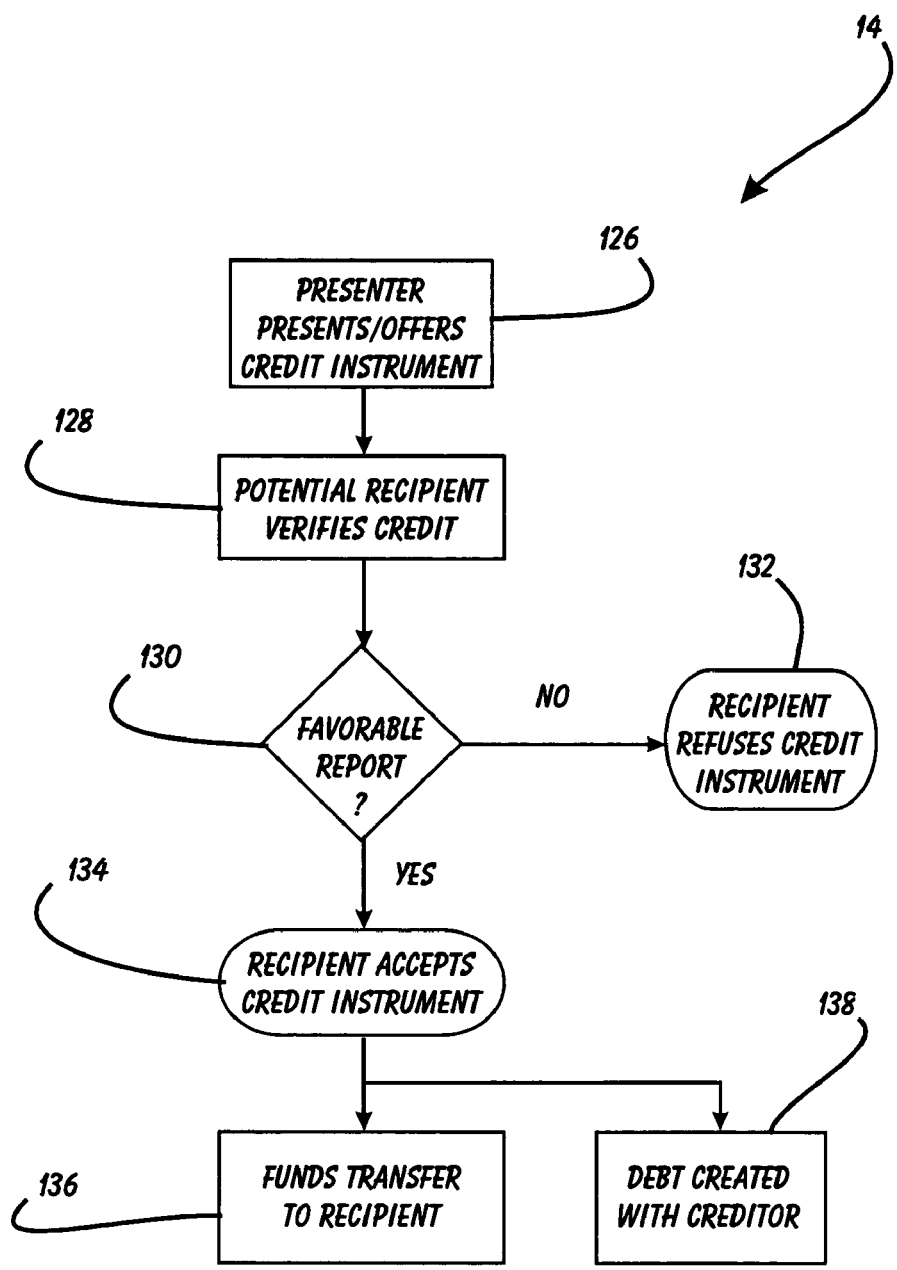
FIG. 3 is a flowchart depicting a conventional payment-by-credit method.

FIG. 3 is a flowchart depicting a conventional payment-by-credit method. Conventional credit purchase method 14 commences with the presenter presenting or offering a credit vehicle 126 to the seller. This could be in the form of a loan, of a credit card or even a debit card. The potential recipient verifies the presenter's credit 128. This credit verification is done through a credit history data repository. Well-known trademarked services include Experian, Equifax and Transunion which are well-known credit history data repositories. The recipient then determines, based on its standards, whether or not the credit report is favorable 130. If the credit report is unfavorable, presumably the recipient will refuse to accept the credit vehicle 132. If the credit report is favorable, however, the recipient will be expected to accept the credit vehicle 134. The funds are then transferred to the recipient 136, typically reduced by a "discount rate," to allow the recipient to receive cash today while the creditor/finance company will receive payment over time into the future. So the funds are transferred to the recipient 136 and the presenter is then left with a debt to the creditor 138. A more creative approach to future payment for current goods or services is depicted below in FIG. 4.

Figure 4:
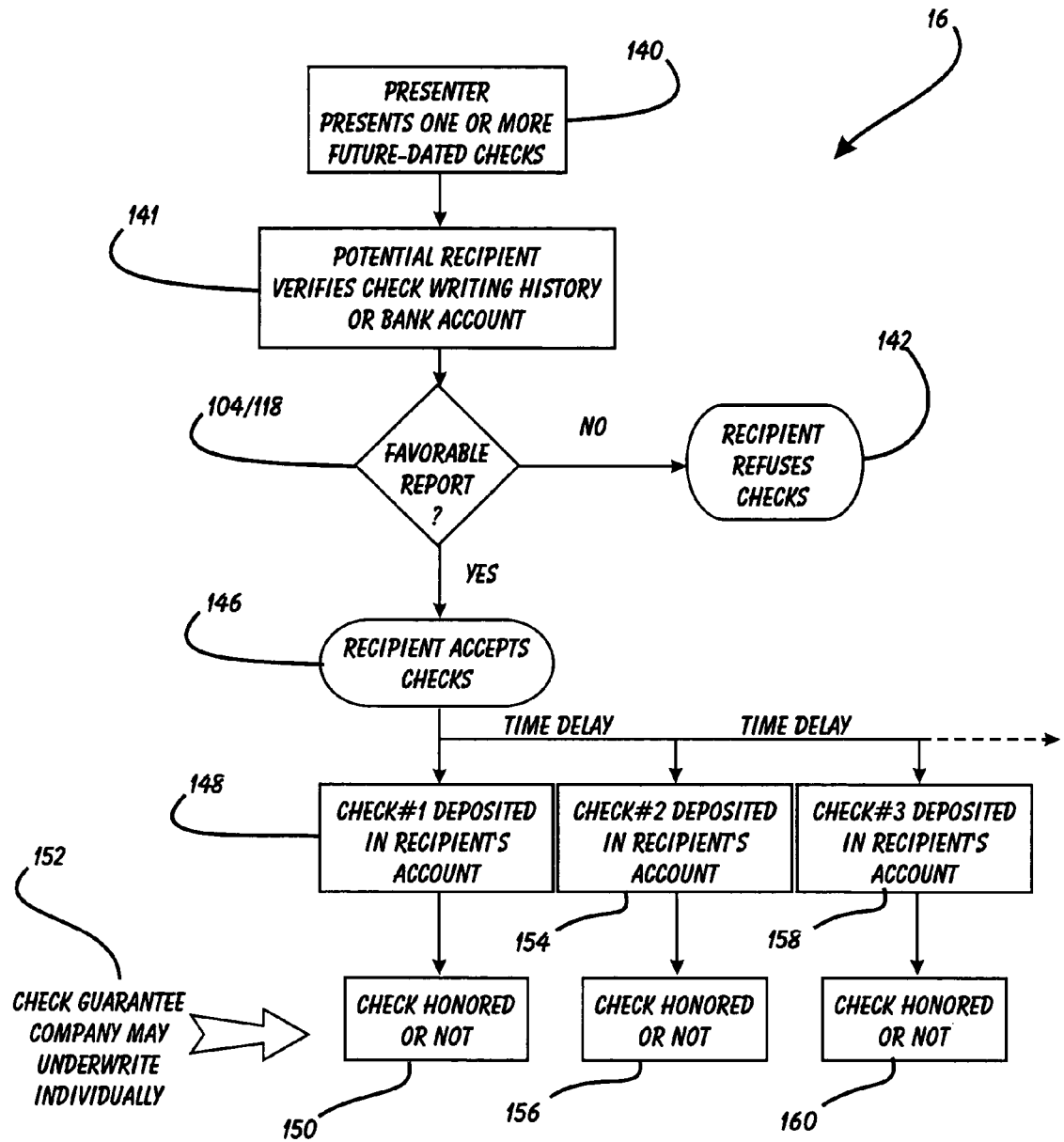
FIG. 4 is a flowchart depicting a conventional payment-by-future check method.

FIG. 4 is a flowchart depicting a conventional payment-by-future check method. FIG. 4 depicts a conventional future check payment method 16. This method is typically used when a potential buyer has an unsatisfactory and/or insufficient credit history to allow them to obtain a credit vehicle. As a result, they would not qualify if the recipient were to verify their credit through conventional credit history data repositories. What happens here then is that the presenter presents one or more future-dated checks 140 (in accordance with an agreement between the parties). Commonly, the presenter will present three checks each for an amount that equals one-third of the purchase price plus an agreed-upon service fee. One of the checks would be dated for a current date and, therefore, could be deposited immediately, while the other two checks are dated for staggered future dates. The potential recipient will then verify the check writing history and/or the bank account 141 to determine whether or not there is a favorable report 104 or 118. Of course, and with the other previously-mentioned methods, the presenter will also provide proof of their identification (e.g. a driver's license). If either verification does not meet the recipient's standards, then the recipient will refuse the checks 142. If, however, the recipient determines that the reports are favorable, the recipient will accept the checks 146.

Typically, the recipient will then deposit check number one into their account 148 (on the agreed-upon date) and that check will be honored or not 150; for example, if there are insufficient funds when the time for funds transfer arrives. Again, this can be underwritten by a check guarantee entity 152. When the date arrives for which check number two is written out, after a time delay, check number two will be deposited in recipient's account 154 and then that check will be honored or not 156. Similarly, at some future future-dated date, check number three will be deposited in the recipient's account 158 and it will be honored or not 160. The check guarantee entity may underwrite this future check payment method individually 152, i.e. if at the time of each check's presentment to the financial institution for funds transfer it is determined that there are insufficient funds, the recipient will still receive its funding and will be left to the check guarantee entity to pursue replacement funding from the presenter.

The problem with these existing payment-by-cash and payment-by-credit methods is that there is still substantial risk for the merchant and it does not enable the merchant receive their funds immediately for the goods or services that he is providing to the presenter today. It, in effect, makes the recipient act as a finance company because they will be receiving their payment over time. What is needed then is a method that enables a merchant to be paid today by a presenter that has insufficient traditional credit to qualify for verification of credit history. Having now reviewed the prior methods and systems, we'll go into the detailed description of the invention. The present invention can best be understood by initial consideration of FIG. 5.

Figure 5:
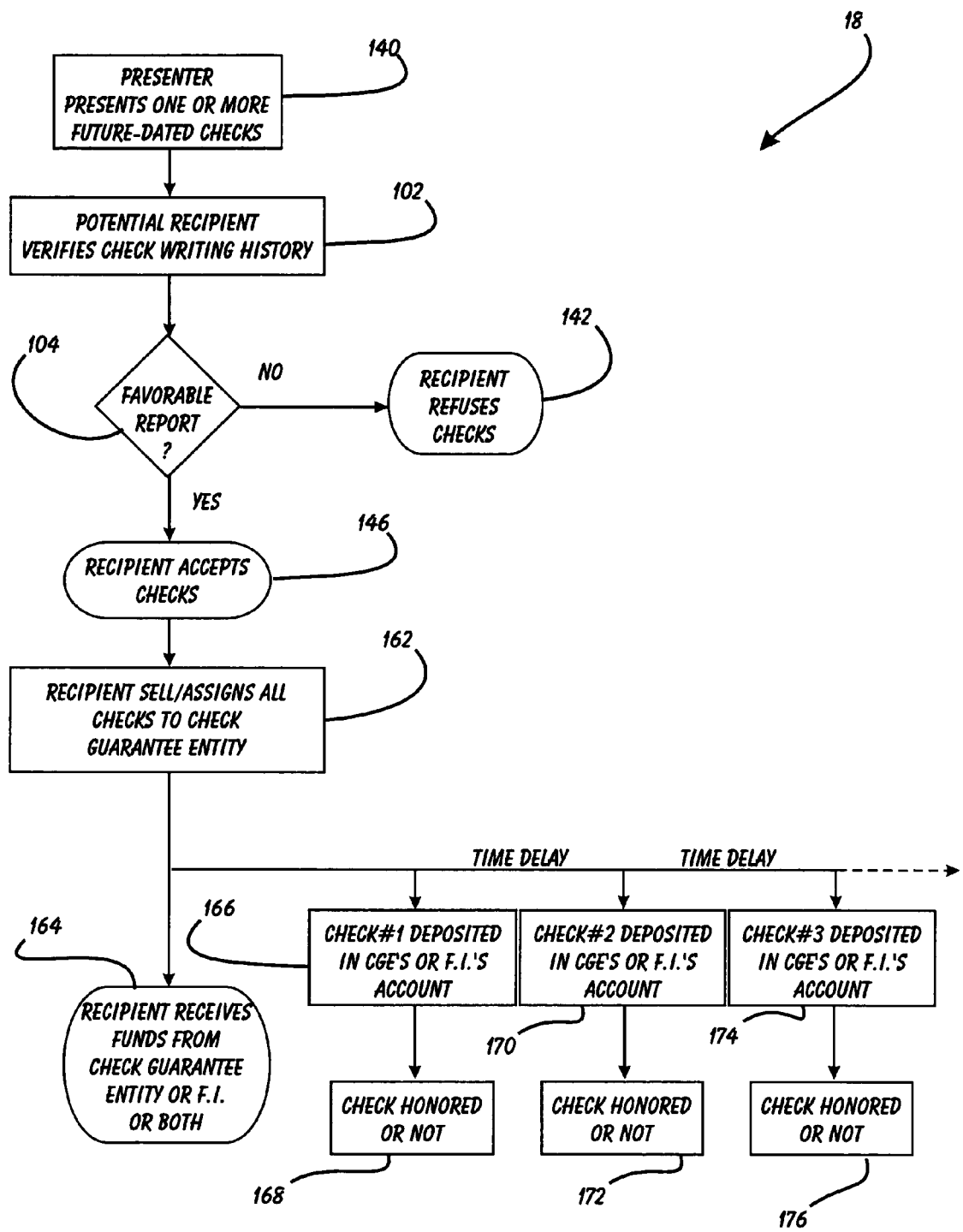
FIG. 5 is a flowchart depicting the current-payment-by-future check method of the present invention.

FIG. 5 is a flowchart depicting the current-payment-by-future check method of the present invention. It is intended to replace the prior method described above in connection with FIG. 3. Anywhere herein that the term "check" is used, it is understood that the inventor is referring to the variety of payment instruments, including ACH, credit cards and debit card; in each such case, the same method will be followed, but instead of a group of future checks being exchanged for goods or services, it is a group of other payment vouchers.

The current payment for future check method 18 of the present invention commences, like the conventional future check payment method, with the presenter presenting one or more future-dated checks 140. Next, the potential recipient simply verifies the presenter's check writing history 102. This is identical to the situation where the recipient will be cashing a current check. The recipient then determines whether or not the check writing history report is favorable 104. Again, just like the prior check cashing method. If the report is unfavorable, the recipient will refuse the checks 142. If, however, the report is favorable, the recipient will accept the checks 146.

It is here that the critical differences between this new method and the prior methods arise. The recipient will then sell the checks to a check guarantee entity 162. These guarantee entities could be the conventional check guarantee entities available today or they might be of the financial institutions themselves (or a combination). Upon consummation of the sale to the guarantee entity, the recipient receives full payment from the check guarantee entity 164 (minus a service charge). When we say full payment here, we, of course, mean payment for the amount of the checks minus the check guarantee entity's service charge. The check guarantee entity then deposits check number one 166 because it is dated for a current date and that check is honored or not 168. Since the check guarantee entity actually is the owner of the checks, there is no external agreement or underwriting necessary. The check guarantee entity will pursue the presenter if the check does not clear. When the date of the second check arrives, the check guarantee entity deposits check number two 170. That check then is honored or not 172 and the check guarantee entity receives payment. At the date of the third check, the check guarantee entity will deposit check number three 174 and that check will be honored or not 176 and the check guarantee entity will receive payment.

This method is powerful because it permits the merchant to be paid immediately rather than having to act like a loan company. It permits the presenter to buy things on time even though they have an insufficient or unsatisfactory credit history, and it enables the check guarantee entity to determine early on what their underwriting standards are so that presumably they would obtain better clients. It would encourage more commerce because it creates greater opportunity for the utilization of funds. Furthermore, it expands the utility of the check writing history data repositories—these have historically only been used when deciding whether to accept a single check as payment, but never have they been used for point-of-sale underwriting a group of future checks, nor have they been used to support or aid in making lending decisions, which the method of the present invention completes.

In another embodiment, the check writing history data repository may also include positive information about the presenter, i.e. where a presenter has an unblemished history, with perhaps weighting for high cash value of checks written. Furthermore in addition to, or in combination with the information obtained through these databases, age of the check writers account (via the check number) for example check 101 vs. check 12536, the amount the check is written for, the age of the check writer (via a form of ID), and/or the location the transaction is taking place (the ZIP code) are examined in making a determination by the recipient and/or check guarantee entity as whether to accept the check(s) or not.

An example of an expansion on this concept is one in which the presenter arrives at the merchant's site and has failed to bring along their checkbook. In such a case, it is believed that the merchant could have a series of blank checks (i.e., without bank account numbers or routing numbers on them), similar to those given to individuals when they open a new account. Rather than waiting for the presenter to go home and retrieve their checkbook, it would be a simple matter for the presenter to contact their bank, typically by telephone, to obtain their bank account and routing information once their identity is verified. The user could then fill out these checks with the appropriate information, future-date the appropriate checks and then the method would proceed just as described in FIG. 5.

In yet another alternate situation, the recipient could create a "schedule of checks" which is a single sheet of paper showing all of the transactions both current and future that have the same effect as individual checks, but are documented in a binding way on a single sheet of paper. This would make it easier and quicker to generate the checks for the presenter's signature. If we now turn to FIG. 6, we can see how the transactions relate to one another.

Figure 6:
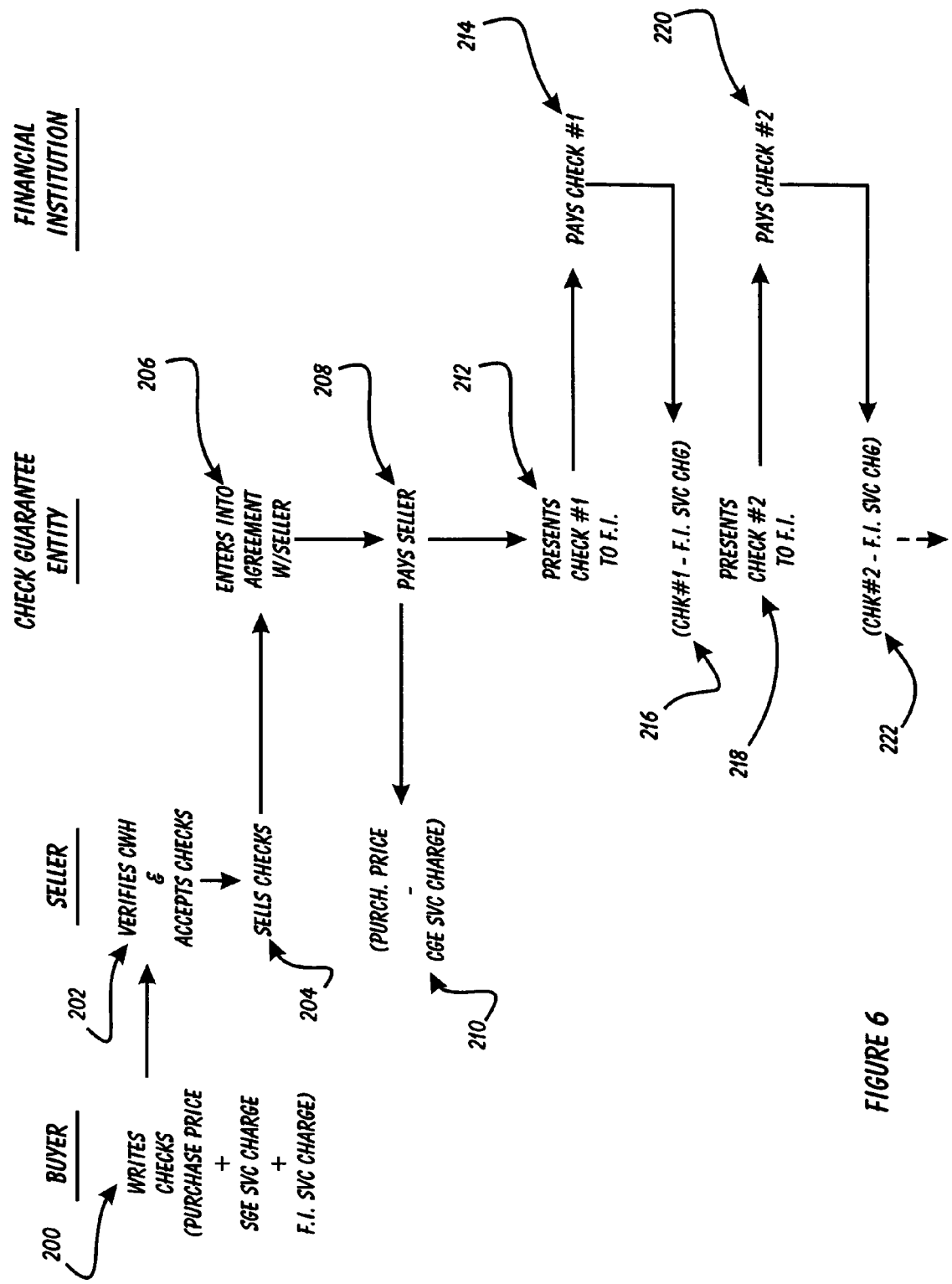
FIG. 6 is a diagram of the funding flow and timing for the method of FIG. 5.

FIG. 6 is a diagram of the funding flow and timing for the method of FIG. 5. As shown here, the buyer first writes the checks which will be for the total of the purchase price plus the check guarantee entity service charge plus an expected financial institution service charge 200. The seller having received the checks verifies the check writing history and accepts the checks 202. The seller then immediately sells the checks 204 to the check guarantee entity, which has previously established the guidelines for entering into agreement with seller 206. The guarantee entity will then pay the seller 208 for the purchase price minus the guarantee entity service charge 210. The guarantee entity will then present check number one to the financial institution 212 after which the financial institution for check number one 214 in an amount that is the check number one amount minus the financial institution's service charge 216. On the date of the second check (future-dated), the check guarantee entity will present check number two 218 to the financial institution. The financial institution will then pay check number two 220 in the amount that is check number two minus their service charge 222. This will repeat until all future-dated checks have been redeemed by the check guarantee entity to the financial institution.

As can be seen here, the buyer has been granted credit because his or her account is not being debited until his or her financial institution pays the checks at some point in the future. The seller is happy because it has received its payment nearly immediately after the sale of its goods and the check guarantee entity is happy because it has generated a fee earlier and for a higher percentage of check transactions. As discussed above, where the term "cash instrument" is used in the claims, it is intended to refer to the use of checks, ACH vouchers, credit card vouchers and the like, in the manner described herein.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A future check financing method, comprising:
   receiving by a recipient at a point of sale, two or more checks from said presenter before delivering goods or services to said presenter,
      wherein said two or more checks comprise a first check to be processed on a first date and a second check to be processed on a second date, wherein said second date is after said first date;
      wherein said presenter has traditional credit history that is insufficient to qualify for an equivalent cash instrument and wherein said traditional credit history is also insufficient to qualify for a credit vehicle wherein said traditional credit history comprises a credit report requested by said recipient, and
      wherein said two or more checks are not backed by sufficient funds to purchase said goods or said services outright at time of said accepting said two or more checks;
   accessing a check writing history database that executes on a computer, wherein said check writing history database is accessed over a network;
   obtaining a check writing history of said presenter from said check writing history database that executes on said computer;
   verifying by said computer said check writing history of said presenter by said recipient;
   accepting said two or more checks from said presenter based on said verifying said check writing history of said presenter without relying on said credit report that is insufficient to qualify for an equivalent cash instrument and wherein said traditional credit history is also insufficient to qualify for a credit vehicle;

selling said two or more checks as received by said recipient from said presenter to a check guarantee entity; and receiving full payment minus a service charge before said second date by said recipient for said first check and said second check from said check guarantee entity, wherein said check guarantee entity receives payment for said first check at said first date, and said check guarantee entity receives payment for said second check at said second date.

2. The method of claim 1, further comprising the steps of:

redeeming by said check guarantee entity said first check after said selling step and on or after said first date; and, providing by a financial institution to said check guarantee entity funds responsive to said redeeming of said first check.

3. The method of claim 2, further comprising the steps of:

waiting by said check guarantee entity for a time period after said providing step;

redeeming by said check guarantee entity said second check on or after said second date; and, providing by said financial institution to said check guarantee entity with funds responsive to said redeeming of said second check.

4. The method of claim 3, wherein said two or more checks each represent a check cash value, the sum of all of said two or more checks totaling a total cash value, said receiving full payment step comprising said receiving payment in an amount equal to said total cash value minus a total financial institution service charge and minus a check guarantee entity service charge.

5. The method of claim 4, further comprising said financial institution providing said check guarantee entity with an amount equal to said check cash value minus a financial institution service charge.

6. The method of claim 1, wherein said verifying said check writing history further comprises utilizing positive information about check writing history of said presenter wherein said positive information comprises a highest cash value of any check written by said presenter.

7. The method of claim 1, wherein said verifying said check writing history further comprises utilizing positive information about check writing history of said presenter wherein said positive information comprises an age of a checking account associated with said presenter.

8. The method of claim 1, wherein said verifying said check writing history further comprises utilizing positive information about check writing history of said presenter wherein said positive information comprises an age said presenter.

9. The method of claim 1, wherein said verifying said check writing history further comprises utilizing positive information about check writing history of said presenter wherein said positive information comprises a ZIP code of a location where said point of sale occurs.

10. The method of claim 1, wherein said verifying said check writing history further comprises utilizing positive information about check writing history of said presenter wherein said positive information comprises:

a highest cash value of any check written by said presenter, and an age of a checking account associated with said presenter, and an age of said presenter, and a ZIP code of a location where said point of sale occurs.

11. The method of claim 1, wherein said accepting comprises making a lending decision based on said check writing history for said two or more checks.

* * * * *